US012430757B2

(12) United States Patent
Soler et al.

(10) Patent No.: US 12,430,757 B2
(45) Date of Patent: Sep. 30, 2025

(54) AUTOMATIC DETERMINATION METHOD OF AT LEAST ONE PARAMETER INDICATIVE OF THE DEGREE OR LEVEL OF FUNCTIONALITY OF A LUNG

(71) Applicants: VISIBLE PATIENT, Strasbourg (FR); LES HOPITAUX UNIVERSITAIRES DE STRASBOURG, Strasbourg (FR)

(72) Inventors: Luc Soler, Strasbourg (FR); Eric Noll, Strasbourg (FR); Pierre Diemunsch, Strasbourg (FR)

(73) Assignees: VISIBLE PATIENT, Strasbourg (FR); LES HOPITAUX UNIVERSITAIRES DE STRASBOURG, Strasbourg (FR)

( * ) Notice: Subject to any disclaimer, the term of this patent is extended or adjusted under 35 U.S.C. 154(b) by 460 days.

(21) Appl. No.: 17/919,211

(22) PCT Filed: Apr. 15, 2021

(86) PCT No.: PCT/EP2021/059764
§ 371 (c)(1),
(2) Date: Oct. 14, 2022

(87) PCT Pub. No.: WO2021/209542
PCT Pub. Date: Oct. 21, 2021

(65) Prior Publication Data
US 2023/0298164 A1 Sep. 21, 2023

Related U.S. Application Data

(60) Provisional application No. 63/011,354, filed on Apr. 17, 2020.

(51) Int. Cl.
G06T 7/11 (2017.01)
G06T 7/00 (2017.01)

(52) U.S. Cl.
CPC ............ *G06T 7/0012* (2013.01); *G06T 7/11* (2017.01); *G06T 2207/10028* (2013.01);
(Continued)

(58) Field of Classification Search
CPC . G06T 2207/10028; G06T 2207/10081; G06T 2207/20036; G06T 2207/20081;
(Continued)

(56) References Cited

U.S. PATENT DOCUMENTS 5,957,128 A * 9/1999 Hecker .................. A61B 5/091
128/204.22
6,287,264 B1 * 9/2001 Hoffman ................ A61B 5/086
600/529

(Continued)

FOREIGN PATENT DOCUMENTS

JP 2010 035635 2/2010

OTHER PUBLICATIONS

Zhou Zhiming et al: 11 Coronavirus disease 1-4 2019: initial chest CT findings, European Radiology, Springer International, Berlin, DE, vol. 30, No. 8, Mar. 24, 2020 (Mar. 24, 2020).

(Continued)

Primary Examiner — Tsung Yin Tsai
(74) Attorney, Agent, or Firm — IPSILON USA, LLP

(57) ABSTRACT

A determination method of at least one parameter indicative of the functionality degree or level of a lung according to the ventilation rate of its cells is provided, on the basis of a volumetric digital medical image of the lung, composed of a voxel cloud. The method includes
determining quantitatively and/or delineating a first volume A of the cloud in which spatial density of voxels is between −950 HU and −450 HU; and determining quantitatively and/or delineating a second volume B of the cloud in which spatial density of voxels is between −750 HU and −450 HU.

(Continued)

Ground-Glass & Restricted Normally aerated area segmentation

Fully Automated 2 Areas segmentation is as accurate than Semi-automated ones

Semi-automated VP 5 Areas = 80mn / Fully Automated VP 2 Areas = 2.5mn

A third volume C is determined quantitatively and/delineated, in addition or alternatively to volume B, defined as the differential volume (volume A−volume B); and the ratio (volume B/volume A) is computed and/or the ratio (volume C/volume A) is computed.

The method includes comparing the value of these (this) ratio and/or the value of said volumes with one or several threshold values and exploiting the result of that comparison or these comparisons as said indicative parameter(s).

10 Claims, 4 Drawing Sheets

(52) U.S. Cl.
CPC ............... *G06T 2207/10081* (2013.01); *G06T 2207/20036* (2013.01); *G06T 2207/20081* (2013.01); *G06T 2207/20084* (2013.01); *G06T 2207/30061* (2013.01)

(58) Field of Classification Search
CPC . G06T 2207/20084; G06T 2207/30061; G06T 7/0012; G06T 7/11
See application file for complete search history.

(56) References Cited

U.S. PATENT DOCUMENTS

| | | | | |
|---|---|---|---|---|
| 11,373,367 | B2* | 6/2022 | Yu | G06T 7/0012 |
| 2015/0332454 | A1* | 11/2015 | Yin | G06T 19/20 |
| | | | | 382/131 |
| 2016/0203263 | A1* | 7/2016 | Maier | G16H 30/40 |
| | | | | 705/2 |
| 2019/0378329 | A1* | 12/2019 | Kiely | A61B 5/349 |
| 2020/0051240 | A1* | 2/2020 | Chassagnon | G06T 7/0012 |
| 2020/0184647 | A1* | 6/2020 | Harrison | G16H 30/40 |
| 2021/0151171 | A1* | 5/2021 | Lee | G16H 30/40 |

OTHER PUBLICATIONS

International Search Report dated Jun. 30, 2021.

* cited by examiner

AUTOMATIC DETERMINATION METHOD OF AT LEAST ONE PARAMETER INDICATIVE OF THE DEGREE OR LEVEL OF FUNCTIONALITY OF A LUNG

RELATED APPLICATION

This application is a National Phase of PCT/EP2021/059764 filed on Apr. 15, 2021, which claims the benefit of priority from U.S. Provisional Application No. 63/011,354 filed on Apr. 17, 2020, the entirety of which are incorporated by reference.

FIELD OF THE INVENTION

The present invention is related to the field of data processing, more specifically to the treatment and analysis of images, in particular of medical images, in order to determine at least one parameter indicative of the degree or level of functionality, in relation to respiratory function, of a lung.

More precisely the present invention concerns an automatic determination method of at least one indicative parameter of the functionality degree or level of a lung.

BACKGROUND

The world is going through an unprecedented sanitary crisis linked to the Covid-19 pandemic. In the face of this crisis, it is essential to propose solutions and tools to help healthcare teams working in tight flow conditions with daily increasing workload. The issue, our solution aims to solve, is to help the medical profession via a simplification of the analysis and the assessment of the state of severity of lung damage of a patient from a simple medical image of lungs. This problem, present in the case of Covid-19 affection, is found in other pathologies such as seasonal flu, pneumonia, embolism, etc.

In the case of Covid-19, scientific literature as well as feedback from medical teams clearly show that for an expert radiologist medical images, in particular CT-scans, allow to distinguish the damage of the virus on a patient. This visual analysis is however not quantified, it is imprecise and subjective. Furthermore, it can also not as such and alone predict the evolution of the patient's state of health. The same limitation is observed with other pathologies from a CT-scan or from an MRI. In fact, existing solutions do not allow to provide a quantitative, automated, fast and reliable score of lung damage of patients.

To reach that result, it has been proposed to set up a new analysis dedicated to intensive care anesthetists and aiming to precisely quantify postoperative atelectasis from CT and MRI medical images (Noll E, Ohana M, Hengen M, Bennett-Guerrero E, Diana M, Giraudeau C, Pottecher J, Meyer N and Diemunsch P, "Validation of MRI for Volumetric Quantification of Atelectasis in the Perioperative Period: An Experimental Study in Swine". Front. Physiol., 4 Jun. 2019; 10(695): 1-10). From the resulting marked and certified software of the Visible Patient company, it has been possible to semi-automatically extract from a medical image the lungs and four zones defined by density in medical scientific literature (cf: Malbouisson L M, Muller J C, Constantin J M, Lu Q, Puybasset L, Rouby J J, "CT Scan ARDS Study Group: Computed tomography assessment of positive end-expiratory pressure-induced alveolar recruitment in patients with acute respiratory distress syndrome". Am J Respir Crit Care Med 2001; 163:1444-1450):

hyperventilated: between −1000 HU and −900 HU
normally ventilated: between −900 HU and −500 HU
poorly ventilated: between −500 HU and −100 HU
not ventilated: between −100 HU and 100 HU.

The problem of this method is that it was not automated and not fast, the segmentation process taking 90 mn to delineate these regions that could be used to characterize a damage level of the respiratory function whatever is the pathology. This impossibility lies in the fact that densities of poorly or not ventilated areas are too close, or even completely identical, to neighboring tissues in the medical images. Furthermore, the exploitation of these images by the practitioner takes time and needs experience.

OBJECTS AND SUMMARY

To overcome this problem, the present invention proposes, based on the unexpected discovery made by the inventors, to determine one or several specifically designed parameters indicating a degree of functionality of lungs, and thus to allow to deduce the severity level of any lung infection, and also to provide associated automatic computation methods of these parameters.

Thus, according to a first aspect of the invention, there is provided, in the form of a computer implemented invention, an automatic determination method of at least one parameter indicative of a functionality degree or level of a lung according to the ventilation rate of its cells, on the basis of a volumetric digital medical image of the lung (CT-scan), composed of a voxel cloud, said method consisting in:

determining quantitatively and/or delineating a first volume A of the cloud in which spatial density of voxels is between −950 HU and −450 HU (HU=Hounsfield Units in a CT-scan), advantageously between −920 HU and −480 HU, preferably approximately between −900 HU and −500 HU;

determining quantitatively and/or delineating a second volume B of the cloud in which spatial density of voxels is between −750 HU and −450 HU, advantageously between −720 HU and −480 HU, preferably approximately between −700 HU and −500 HU;

determining quantitatively and/delineating a third volume C, in addition or alternatively to volume B, defined as the differential volume (volume A−volume B) and called "Restricted Normally aerated volume";

computing the ratio (volume B/volume A) and/or computing the ratio (volume C/volume A);

comparing the value of these (this) ratio(s) and/or the value of said volumes with one or several threshold values and exploiting the result of that comparison or these comparisons as said indicative parameter(s).

Thus, the invention proposes to subdivide volume A of the voxel cloud representing a lung and to provide at least one parameter in the form of a volume ratio between one of the sub-volumes B or C and volume A, which ratio(s) is (are) indicative of the degree of functionality of said lung as surprisingly noticed by the inventors.

Advantageously, the afore mentioned volume A corresponds to the volume referred to as "normally aerated" in the publication: "Malbouisson L M, Muller J C, Constantin J M, Lu Q, Puybasset L, Rouby J J, CT Scan ARDS Study Group: Computed tomography assessment of positive end-expiratory pressure-induced alveolar recruitment in patients with acute respiratory distress syndrome". Am J Respir Crit Care Med 2001; 163:1444-1450.

Advantageously, the afore mentioned volume B significantly corresponds to the volume referred to as "ground glass" in the publication: Hansell D M, Bankier A A, MacMahon H, McLoud T C, Müller N L, Remy J. Fleischner Society: glossary of terms for thoracic imaging. Radiology. 2008 March; 246(3):697-722. doi: 10.1148/radiol.2462070712. Epub 2008 January 14.

The threshold values intended to be compared to the aforementioned ratio or volume values and enabling the method to provide the said indicative parameter(s) are determined during a calibration and learning phase during which cases whose outcomes are known are processed.

In order to be able to provide the medical practitioner with information on the global situation of a considered patient, the method is simultaneously or successively applied to voxel clouds of both lungs of the patient, to deduce a parameter indicative of the patient's global respiratory situation.

According to a possible practical embodiment of the invention, the method consists in processing voxel cloud(s), corresponding to 3D image(s) of the thoracic region of a patient, by executing software operators configured to segment skin, trachea, volume A and volume B, preferably in that order.

Preferably, the voxel cloud may be processed by slicing it down into parallel 2D images which can be treated independently or not, the segmentation information of the different 2D images being merged or combined by fusion in a last stage, providing the desired volumetric or 3D segmentation used to compute the ratio(s). It would also be possible to compute the ratio(s) directly in each 2D and to sum up these fractional data in order to achieve the volumetric ratio(s).

To perform this task, methods such as the ones described in E. Noll, L. Soler, M. Ohana, P. O. Ludes, J. Pottecher, E. Bennett-Guerrero, F. Veillon, F. Schneider, N. Meyer, P. Diemunsch. A novel, automated, quantification of abnormal lung parenchyma in patients with Covid-19 infection: initial description of feasibility and association with clinical outcome. Anaesthesia Critical Care & Pain Medicine, Available online 13 Nov. 2020, 100780 may be used. The methods disclosed by WO 2019/137997 and WO 2019/138001 (using CNNs) can also be considered, as well as the one mentioned in: Soler L, Nicolau S, Hostettler A, et al." Computer assisted digestive surgery. In: Computational surgery and dual training". 2010; 139-53 (using elementary operators).

Advantageously, it may be envisaged to implement or realize one of several operators capable and intended to retrieve the partial volume effect and the potential isolated non-representative voxels for volumes B, typically mathematical morphology operators such as an erosion followed by a dilation (defined as an opening) of one 1 voxel in 6-neighborhood.

For example, possible software operators described in E. Noll, L. Soler, M. Ohana, P. O. Ludes, J. Pottecher, E. Bennett-Guerrero, F. Veillon, F. Schneider, N. Meyer, P. Diemunsch. "A novel, automated, quantification of abnormal lung parenchyma in patients with Covid-19 infection: initial description of feasibility and association with clinical outcome". Anaesthesia Critical Care & Pain Medicine, Available online 13 Nov. 2020, 100780, could be used.

In relation to a possible additional feature of the invention, the method may also consist in:
a) computing, additionally or alternatively, the ratio (volume A−volume B)/volume A, and
b) comparing the value of that ratio to one or several threshold values, and exploiting the result of this comparison as an indicative parameter, with volume A−volume B=volume C as previously mentioned, volume C thus corresponding to a volume in which the spatial density of voxels is approximately between approximately −950 to −900 HU and approximately −750 and −700 HU, preferably approximately between −900 HU and −700 HU.

Furthermore, and in accordance with one or several possible additional features of the invention, the method may also consist:
in quantitatively determining and/or delineating another volume (called PA: "Poorly aerated") in which the spatial density of voxels is between approximately −500 HU and approximately −100 HU, and/or
in quantitatively determining and/or delineating another volume (called NA: "Non Aerated") in which the spatial density of voxels is between approximately −100 HU and approximately 100 HU, and/or
in quantitatively determining and/or delineating another volume (called OI: "Over-Inflated") in which the spatial density of voxels is between approximately −1000 HU and approximately −900 HU.

These additional volumes allow to have more information that can be used or exploited by the practitioner to estimate other kinds of pathology effects, such as emphysema.

According to a practical aspect of the invention, the method is realized, at least for image segmentation operations, by using or executing a neural network, in particular a convolutional neural network, for example a CNN known as U-Net.

For example, a possible CNN based method could be one corresponding to or derived from the one described in:
Olivier Petit, Nicolas Thome and Luc Soler: "Biasing Deep ConvNets for Semantic Segmentation of Medical Images with a Prior-driven Prediction Function", Medical Imaging with Deep Learning, London, 8-10 Jul. 2019; or in
Olivier Petit, Nicolas Thome, Arnaud Charnoz, Alexandre Hostettler and Luc Soler: "Handling Missing Annotations for Semantic Segmentation with Deep ConvNets, Deep Learning in Medical Image Analysis and Multimodal Learning for Clinical Decision Support", MICCAI 2018 LNCS 10553, Springer professional ed.

The segmentation methods described in WO 2019/137997 and WO 2019/138001 may also be applied.

The present invention also encompasses a computer or data processing system comprising means for carrying out the steps of the method as described before, and configured to provide at least one indicative parameter, as well as a computer program comprising instructions which, when the program is executed by a computer system, causes said system to carry out the steps of said method.

BRIEF DESCRIPTION OF THE DRAWINGS

The attached drawings allow to illustrate and evaluate, by way of example, some of the results obtained by the computer implemented method of the invention, whose features and possible aspects have been described herein before.

In FIG. 1A, two useful areas (corresponding to useful volumes in relation to the indicative ratios of the invention) are defined: volume B (orange) and volume C (pink), their association forming the volume A. Additionally, said figure also shows the area (in dark/black) corresponding to the OI volume, as well as the trachea (in red in the middle) and the surrounding skin.

In FIG. 1B, two additional areas are shown, corresponding to two other possibly meaningful volumes in accordance with the invention, namely volume PA in light green color and volume NA in darker green color.

DETAILED DESCRIPTION

Figure 1A:
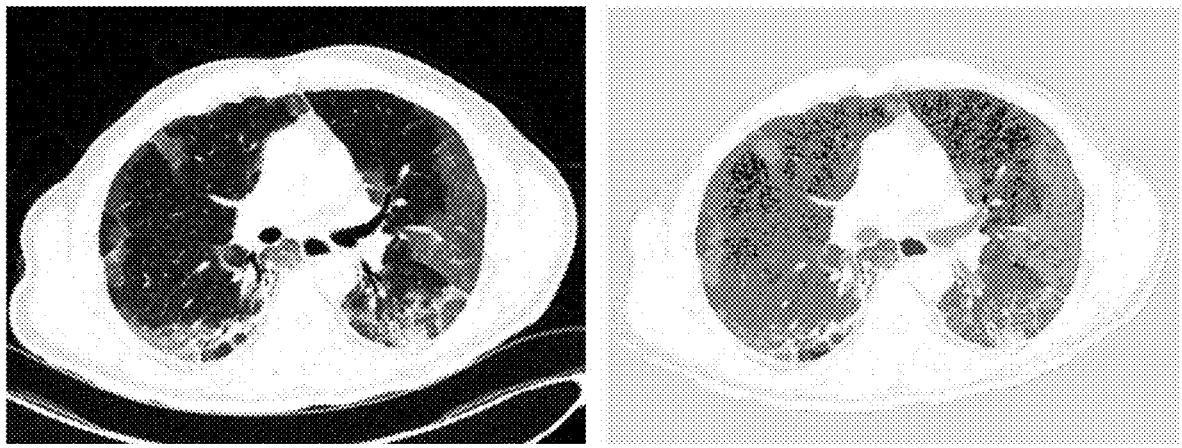
FIGS. 1A and 1B illustrate two types of processing of a 2D thoracic CT-scan image in accordance with two possible embodiments of the invention.
Figure 1B:
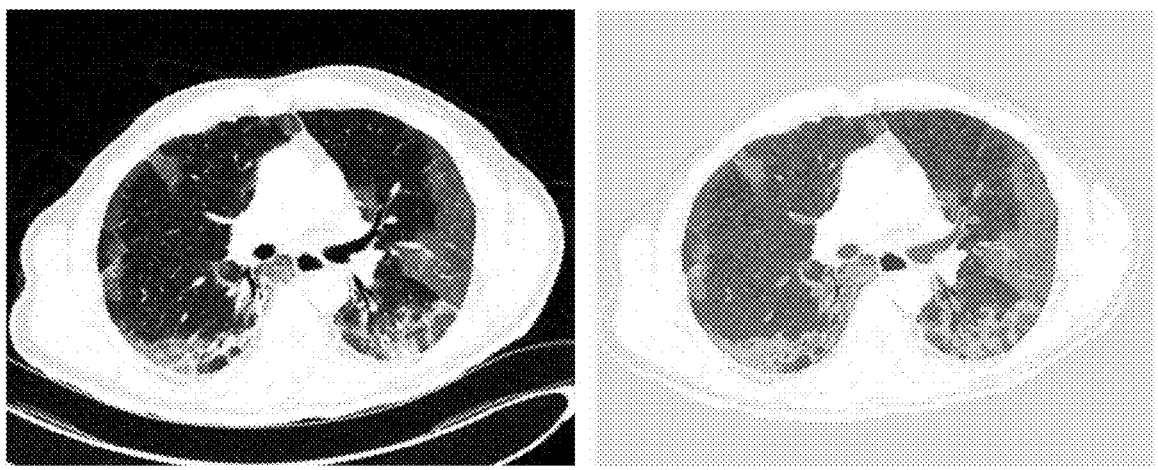
Figure 2:
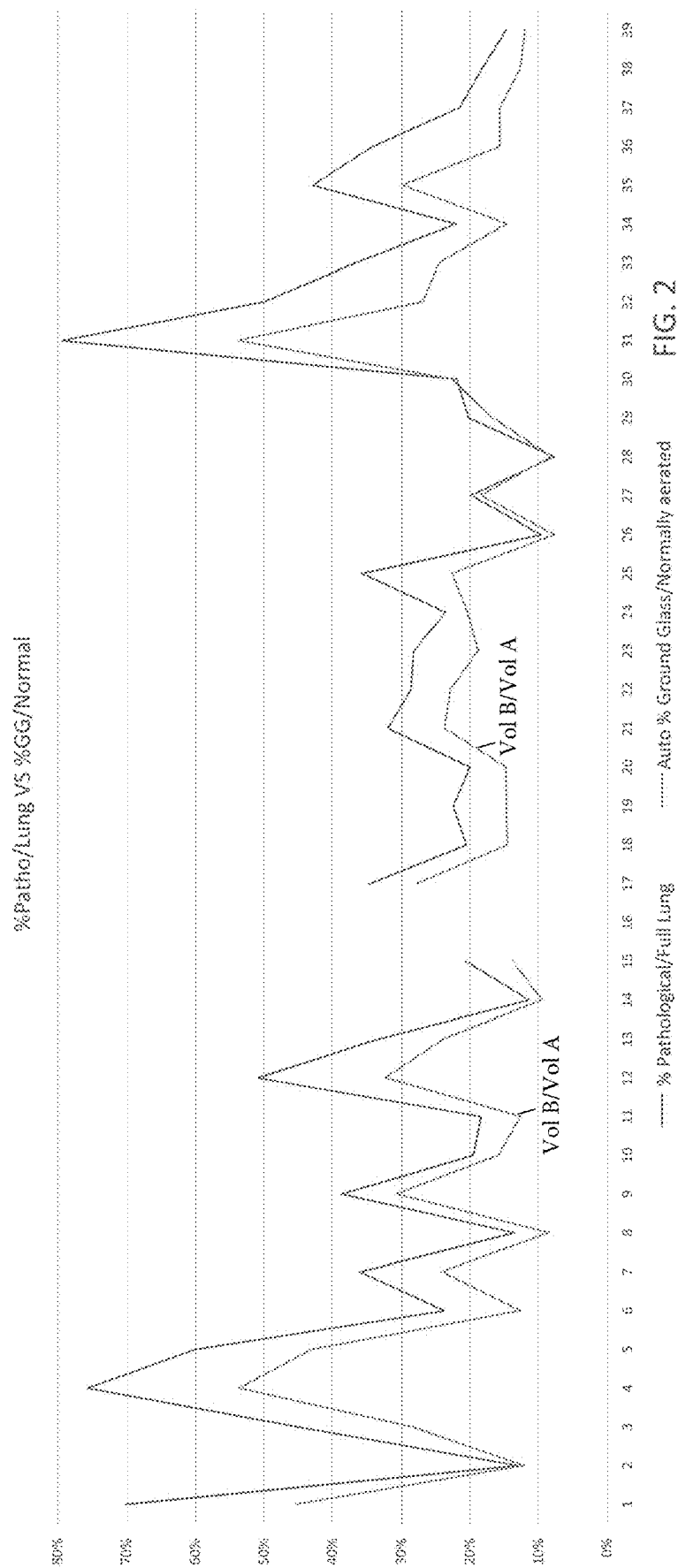
FIG. 2 illustrates the correlation between the indicative parameter volume B/volume A and the % of pathological area in the total lung volume, justifying the relevance of said ratio. This figure also shows indirectly the relevance of the ratio volume C/volume A, due to the relation between volume B and volume C.
Figure 3:
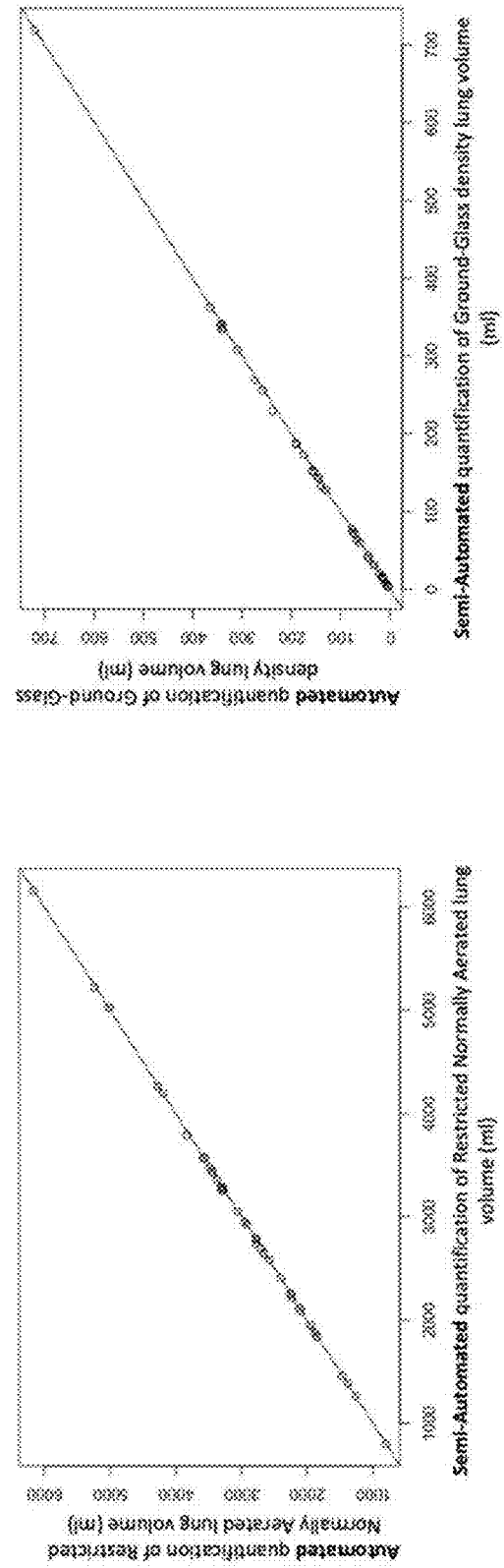
FIGS. 3 and 4 illustrate the accuracy of the automatic segmentation of the invention with respect to a semi-automated one as mentioned in the introductory part of the present specification.
Figure 4:
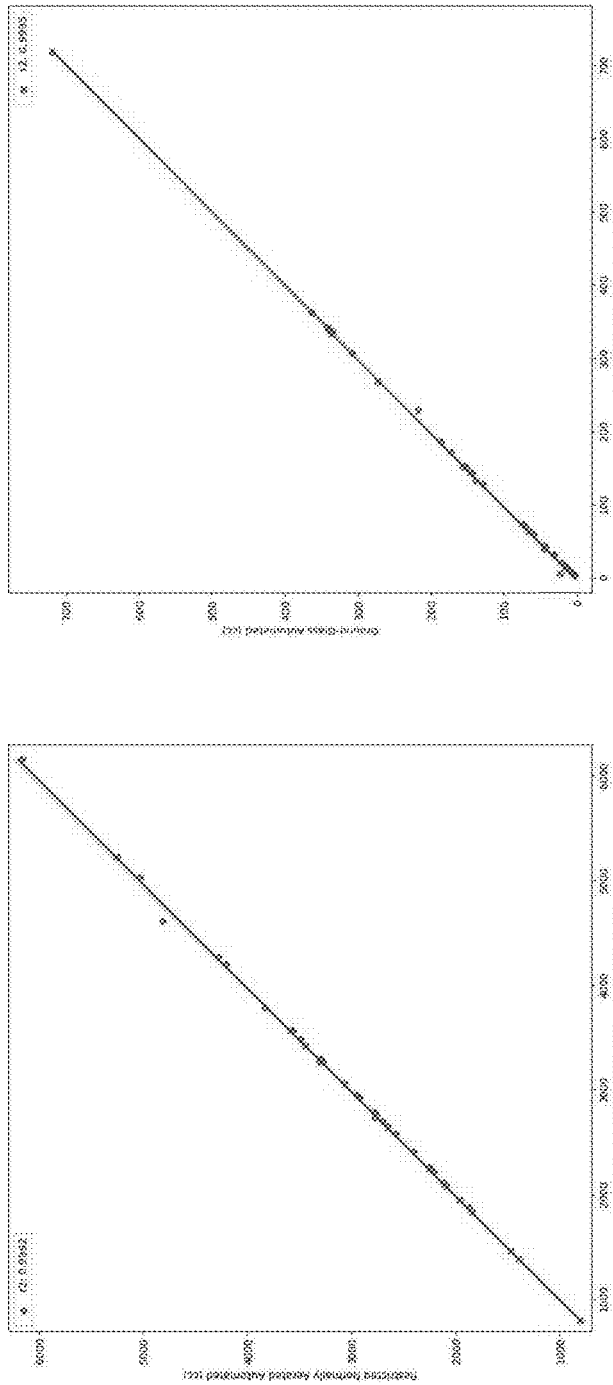

The relevance of the specific indicative parameters of the invention, and the fully automated and computer implemented method computing theses parameters, have been efficiently and clinically tested, demonstrating the accuracy and predictability benefit of the present invention.

More specifically, an implemented embodiment and results obtained with the inventive method in the context of clinical tests are described in E. Noll, L. Soler, M. Ohana, P. O. Ludes, J. Pottecher, E. Bennett-Guerrero, F. Veillon, F. Schneider, N. Meyer, P. Diemunsch. "A novel, automated, quantification of abnormal lung parenchyma in patients with Covid-19 infection: initial description of feasibility and association with clinical outcome". Anaesthesia Critical Care & Pain Medicine, Available online 13 Nov. 2020, 100780 whose content in incorporated herein by reference.

The method according to the present invention provides of course only an evaluation tool and a pointer to the practitioner which combined with other parameters and of course visual checking allows him/her to issue a more reliable diagnostic.

Of course, the invention is not limited to the at least one embodiment described. Modifications remain possible, particularly from the viewpoint of the composition of the various elements or by substitution of technical equivalents without thereby exceeding the field of protection of the invention.

The invention claimed is:

1. An automatic determination method of at least one parameter indicative of the functionality degree or level of a lung according to the ventilation rate of its cells, on the basis of a volumetric digital medical image of the lung, composed of a voxel cloud, said method comprising the steps of:
   determining quantitatively and/or delineating a first volume A of the cloud in which spatial density of voxels is between approximately between −900 HU and −500 HU;
   determining quantitatively and/or delineating a second volume B of the cloud in which spatial density of voxels is approximately between −700 HU and −500 HU;
   determining quantitatively and/or delineating a third volume C corresponding to a volume in which the spatial density of voxels is approximately between −900 HU and −700 HU, and also defined as the differential volume [volume A−volume B];
   computing the ratio [volume B/volume A] and/or computing the ratio [volume C/volume A];
   comparing the value of these (this) ratio with one or several predetermined threshold values and exploiting the result of that comparison or these comparisons as said indicative parameter(s),
   processing voxel cloud(s) by executing software operators configured to segment skin, trachea, volume A and volume B, preferably in that order, and
   retrieving the partial volume effect and the potential isolated non-representative voxels for volumes B by realizing one or several mathematical operators, typically mathematical morphology operators such as an erosion followed by a dilation (defined as an opening) of one 1 voxel in 6-neighborhood.

2. The automatic determination method according to claim 1, wherein said method is simultaneously or successively applied to voxel clouds of both lungs of a patient, to deduce an indicative parameter of the patient's respiratory situation.

3. The automatic determination method according to claim 1, wherein said method further comprises quantitatively determining and/or delineating another volume in which the spatial density of voxels is between approximately −500 HU and approximately −100 HU.

4. The automatic determination method according to claim 1, wherein said method further comprises quantitatively determining and/or delineating another volume in which the spatial density of voxels is between approximately −100 HU and approximately 100 HU.

5. The automatic determination method according to claim 1, wherein said method further comprises quantitatively determining and/or delineating another volume in which the spatial density of voxels is between approximately −1000 HU and approximately −900 HU.

6. The automatic determination method according to claim 1, wherein said method is realized, at least for image segmentation operations, by executing a neural network, in particular a convolutional neural network.

7. The automatic determination method according to claim 6, wherein said convolutional neural network is U-Net.

8. The automatic determination method according to claim 1, wherein said method uses one or several indicative parameters, automatically or not, in connection with one or several other existing parameters or criteria describing patients' health or physiology, in order to sort patients into a severity level of a given pathology affecting the functionality degree or level of the lungs, which will allow a physician to have more informative data to optimize a therapy proposal.

9. A computer or data processing system comprising means for carrying out the steps of the method of claim 1, and configured to provide at least one indicative parameter.

10. A non-transitory computer readable medium comprising instructions which, when executed by a computer system, causes said system to carry out the steps of the method of claim 1.

* * * * *